United States Patent
Shi (10) Patent No.: US 11,650,880 B2
(45) Date of Patent: May 16, 2023

(54) WRITE HOLE PROTECTION METHOD AND SYSTEM FOR RAID, AND STORAGE MEDIUM

(71) Applicant: INSPUR SUZHOU INTELLIGENT TECHNOLOGY CO., LTD., Jiangsu (CN)

(72) Inventor: Peiren Shi, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/642,643

(22) PCT Filed: Nov. 27, 2019

(86) PCT No.: PCT/CN2019/121096
§ 371 (c)(1),
(2) Date: Mar. 11, 2022

(87) PCT Pub. No.: WO2021/072917
PCT Pub. Date: Apr. 22, 2021

(65) Prior Publication Data
US 2022/0350703 A1 Nov. 3, 2022

(30) Foreign Application Priority Data
Oct. 18, 2019 (CN) .......................... 201910995233.2

(51) Int. Cl.
*G06F 11/00* (2006.01)
*G06F 11/10* (2006.01)
*G06F 11/14* (2006.01)

(52) U.S. Cl.
CPC ...... *G06F 11/1096* (2013.01); *G06F 11/1084* (2013.01); *G06F 11/1469* (2013.01)

(58) Field of Classification Search
CPC ............. G06F 11/1084; G06F 11/1088; G06F 11/1096; G06F 11/1469
See application file for complete search history.

(56) References Cited

U.S. PATENT DOCUMENTS 8,839,028 B1 * 9/2014 Polia ................... G06F 11/1088
714/6.24
10,353,614 B2 7/2019 Yang
(Continued)

FOREIGN PATENT DOCUMENTS

| CN | 102023809 A | 4/2011 |
| CN | 102968361 A | 3/2013 |

(Continued)

OTHER PUBLICATIONS

First Office Action and English Translation CN201910995233.2, dated Oct. 9, 2020, 7 pages.
(Continued)

*Primary Examiner* — Marc Duncan
(74) *Attorney, Agent, or Firm* — Cooper Legal Group, LLC (57) ABSTRACT

A write hole protection method and system for a RAID, and a storage medium. The method comprises: presetting a log area, and after a RAID is degraded, setting the log area to be in an enabled state; when the log area is in the enabled state, determining, before each stripe write operation, whether a data block of a failed member disk of the RAID in a stripe is a check data block; if the data block is not the check data block, determining whether data blocks to be written of the stripe comprise a data block to be written into the failed member disk; if yes, backing up the data block to be written into the failed member disk in the log area; if not, calculating the data block of the failed member disk and backing up the data block in the log area, or backing up the data blocks to be written in the log area; and when the degraded RAID is
(Continued)

started after a failure, performing data recovery using the log area. By using the present solution, the write hole issue of the RAID is avoided.

8 Claims, 2 Drawing Sheets

(56) References Cited

U.S. PATENT DOCUMENTS

| | | | |
|---|---|---|---|
| 11,093,331 B2* | 8/2021 | Kang | G06F 11/1004 |
| 2009/0300282 A1 | 12/2009 | Rowlands | |
| 2017/0308332 A1 | 10/2017 | Yi et al. | |
| 2019/0129643 A1 | 5/2019 | Sun et al. | |
| 2019/0332477 A1* | 10/2019 | Han | G06F 11/1088 |

FOREIGN PATENT DOCUMENTS

| | | |
|---|---|---|
| CN | 104035830 A | 9/2014 |
| CN | 104407821 A | 3/2015 |
| CN | 104881242 A | 9/2015 |
| CN | 107273046 A | 10/2017 |
| CN | 106062721 B | 11/2018 |
| CN | 109725831 A | 5/2019 |

OTHER PUBLICATIONS

Notification to Grant Patent Right for Invention and English Translation CN201910995233.2, dated Mar. 15, 2021, 3 pages.
International Search Report and English Translation PCT/CN2019/121906 dated Jul. 20, 2020, 6 pages.
Written Opinion and English Translation PCT/CN2019/121906 dated Jul. 20, 2020, 6 pages.

* cited by examiner

WRITE HOLE PROTECTION METHOD AND SYSTEM FOR RAID, AND STORAGE MEDIUM

CROSS-REFERENCE TO RELATED APPLICATIONS

The present application claims priority to Chinese Patent Application No. 201910995233.2, filed to the China Patent Office on Oct. 18, 2019, entitled "Write Hole Protection Method and System for RAID, and Storage Medium", the contents of which are hereby incorporated by reference in its entirety.

TECHNICAL FIELD

The present invention relates to the technical field of computer data storage, and in particular, to a write hole protection method and system for a redundant array of independent disks (RAID), and a storage medium.

BACKGROUND ART

Mechanical hard disks and solid state disks are the most commonly used data storage devices in computer systems. Modern computer servers and storage systems are generally configured with a plurality of disks. In order to improve the capacity and performance of a single logical disk, the plurality of disks may be formed into an array using a RAID technology. The mainstream RAID types include RAID0, RAID1, RAID5, RAID6, etc. RAID5 and RAID6 have higher comprehensive value in available capacity and performance, and are most widely used.

However, if a system failure occurs after RAID5 and RAID6 are degraded due to failures, interruption of reading and writing will be caused, and there is a possibility of data errors, i.e. a "write hole" problem of RAID5 and RAID6.

Taking RAID5 as an example, a stripe includes a plurality of conventional data blocks and a check data block. Each data block is stored in different member disks of the RAID. For example, one stripe includes data blocks 1 to 5, the data blocks 1 to 4 are all conventional data blocks that are sequentially stored in member disks 1 to 4, and the data block 5 is a check data block that is stored in a member disk 5. When any one member disk is failed, the data block of the failed member disk may be calculated based on other member disks. For example, if the member disk 1 is failed, the data block in the member disk 1 may be recovered according to the conventional data blocks in the member disks 2 to 4 and the check data block in the member disk 5. RAID5 is in a degraded state after one member disk is failed and before recovery.

Since the write conditions and write progress of all member disks are not strictly synchronized in the write process of RAID stripes, after RAID5 is degraded and if a failure occurs again, such as interruption of reading and writing caused by power-off, the amount and starting and ending positions of data written into healthy member disks will be different for a certain stripe, and then after a system recovers, an error may occur in calculating data of a failed member disk according to the healthy member disks. This is the "write hole" problem of RAID5.

Compared with RAID5 allowing failure of one member disk, RAID6 has two check data blocks in one stripe, and the failure of at most two member disks is allowed. The reason for the "write hole" problem is the same as RAID5, and will not be described again.

Aiming at the write hole problem of RAID5 and RAID6, some solutions have proposed a storage system with dual controllers to solve the write hole problem by synchronously backing up stripe write data between dual controllers. However, with the popularity and performance improvement of solid state disks, the performance of a plurality of disks is higher than the communication performance between controller systems. In such solutions, the communication performance between dual controllers becomes a bottleneck, and such solutions are not applicable to single-controller systems.

In summary, how to effectively solve the write hole problem of RAID5 and RAID6 is a technical problem urgently to be solved by a person skilled in the art at present.

SUMMARY OF THE INVENTION

An object of the present invention is to provide a write hole protection method and system for a RAID, and a storage medium, so as to avoid the write hole problem of the RAID.

In order to solve the above technical problem, the present invention provides the following technical solutions.

A write hole protection method for a RAID includes:

presetting a log area, and setting the log area to be in an enabled state after a RAID is degraded;

when the log area is in the enabled state, determining, before each stripe write operation, whether a data block of a failed member disk of the RAID in a stripe is a check data block;

if the data block is not the check data block, determining whether data blocks to be written of the stripe include a data block to be written into the failed member disk;

if yes, backing up the data block to be written into the failed member disk in the log area;

if no, calculating the data block of the failed member disk according to a RAID algorithm and backing up the data block in the log area, or backing up the data blocks to be written in the log area; and when the degraded RAID is started after a failure, performing data recovery using the log area.

Preferably, during each backup operation of data blocks in the log area, the method further includes: saving association information of the backup operation to form a stripe log.

Correspondingly, the performing data recovery using the log area includes:

determining each valid stripe log through association information of the stripe logs in the log area, and performing data recovery based on the determined valid stripe logs.

Preferably, the saved association information includes at least: a stripe sequence number and a log number of the stripe log.

Correspondingly, the determining each valid stripe log through association information of the stripe logs in the log area includes:

traversing the association information of the stripe logs in the log area, and taking the stripe log having the largest log number among the stripe logs having the same stripe sequence number as the valid stripe log.

Preferably, the saved association information includes at least: a stripe sequence number, a log number and a stripe log check value of the stripe log.

Correspondingly, the determining each valid stripe log through association information of the stripe logs in the log area includes:

traversing the association information of the stripe logs in the log area, and filtering the incomplete stripe logs according to the stripe log check values in the association information; and taking the stripe log having the largest log number among the filtered stripe logs having the same stripe sequence number as the valid stripe log.

Preferably, the saved association information includes at least: a stripe sequence number, a log number, a stripe log check value and a log version number of the stripe log.

After performing data recovery using the log area, the method further includes: updating a log area version number in general information recorded in the log area.

Correspondingly, the determining each valid stripe log through association information of the stripe logs in the log area includes:

traversing the association information of the stripe logs in the log area, and filtering the stripe logs of which the log version numbers do not match the current log area version number in the log area;

filtering the incomplete stripe logs according to the stripe log check values in the association information; and taking the stripe log having the largest log number among the filtered stripe logs having the same stripe sequence number as the valid stripe log.

Preferably, the performing data recovery based on the determined valid stripe logs includes:

when any valid stripe log in the log area backs up a data block of a failed member disk, calculating check block data based on backup data in the stripe log and read data of member disks, and performing data recovery of a check disk using the calculated check block data; and when any valid stripe log in the log area backs up data blocks to be written, writing the data blocks to be written into corresponding healthy member disks to complete data recovery.

Preferably, the presetting a log area includes:

dividing a space of a preset size from each member disk of the RAID, and forming the set log area by the divided spaces.

Preferably, the presetting a log area includes:

setting the log area using solid state disks other than the member disks of the RAID.

A write hole protection system for a RAID includes:

a log area setting module, configured to preset a log area, and set the log area to be in an enabled state after a RAID is degraded;

a first determination module, configured to determine, before each stripe write operation when the log area is in the enabled state, whether a data block of a failed member disk of the RAID in a stripe is a check data block;

if the data block is not the check data block, a second determination module being triggered;

the second determination module, configured to determine whether data blocks to be written of the stripe include a data block to be written into the failed member disk;

if yes, a first backup module being triggered, and if no, a second backup module being triggered;

the first backup module, configured to back up the data block to be written into the failed member disk in the log area;

the second backup module, configured to calculate the data block of the failed member disk according to a RAID algorithm and back up the data block in the log area, or back up the data blocks to be written in the log area; and a data recovery module, configured to perform, when the degraded RAID is started after a failure, data recovery using the log area.

A computer-readable storage medium has stored thereon a computer program which, when executed by a processor, implements the steps of the write hole protection method for a RAID described in any of the above.

The technical solution provided by embodiments of the present invention does not involve multi-controller communication, i.e. the solution of the present application may be applied in single-controller occasions or multi-controller occasions. However, in the solution of the present application, a log area is preset, the log area is set to be in an enabled state after a RAID is degraded, and a corresponding backup operation is performed before each stripe write operation, thereby avoiding the write hole problem. Specifically, when a data block of a failed member disk is backed up, since the backup is an overall backup, the data block of the failed member disk may be obtained directly through the log area and is correct data. In addition, it is also possible to read data blocks of other healthy member disks, and calculate a correct check data block in combination with the backed-up data block of the failed member disk, so as to avoid the case where the check data block is erroneous. If data blocks to be written are backed up, i.e. the data block to be written into the healthy member disks are backed up, indicating that the write operation does not involve the failed member disk, the backed-up data blocks to be written may be directly written into the corresponding healthy member disks, so that the data of each healthy member disk is correct data. Therefore, the solution of the present application avoids the write hole problem of the RAID.

BRIEF DESCRIPTION OF THE DRAWINGS

In order to more clearly illustrate the technical solutions in the embodiments of the present invention or the prior art, the drawings needing to be used in the description of the embodiments or the prior art will be briefly introduced below, it is obvious that the drawings in the following description are merely some embodiments of the present invention, and a person of ordinary skill in the art may also obtain other drawings according to these drawings without involving any inventive effort.

DETAILED DESCRIPTION OF THE INVENTION

The core of the present invention is to provide a write hole protection method for a RAID to avoid the write hole problem of the RAID.

In order to make a person skilled in the art better understand the solutions in the present invention, the present invention will be further described in detail below with reference to the accompanying drawings and specific implementations. It is obvious that the described embodiments are only some embodiments of the present invention, rather than all the embodiments. All other embodiments obtained by a person of ordinary skill in the art based on the embodiments in the present invention without involving inventive efforts should fall within the scope of protection of the present invention.

Figure 1:
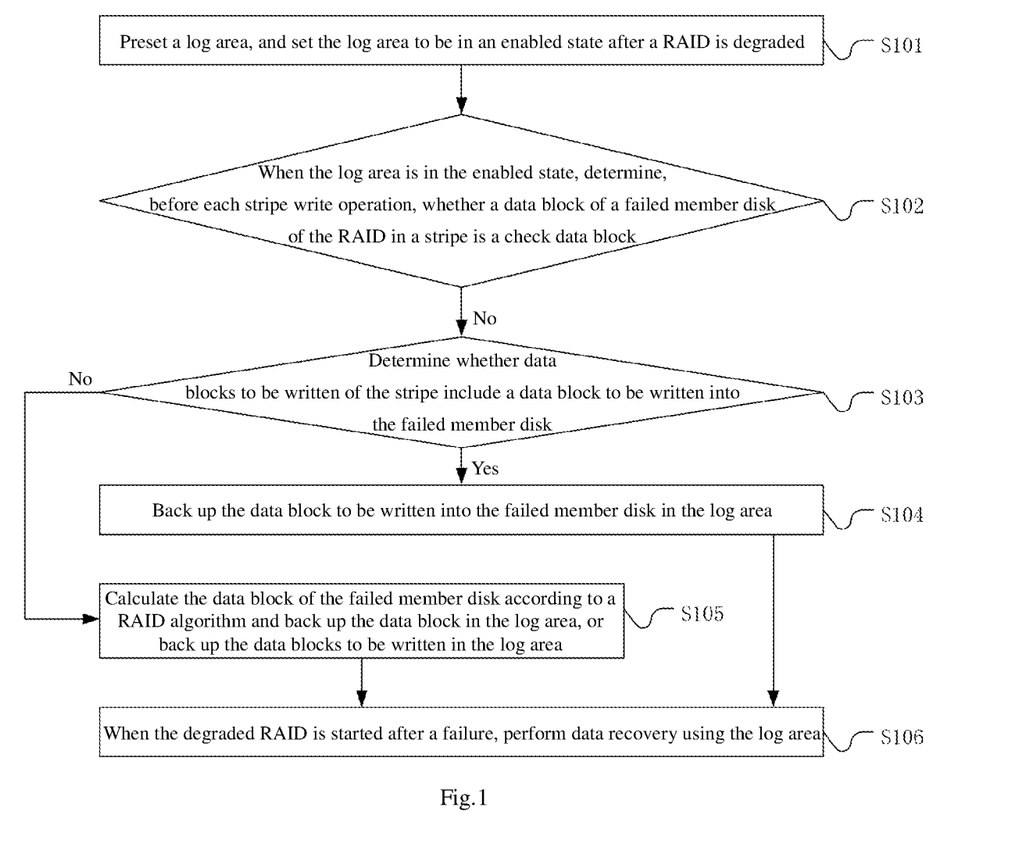
FIG. 1 is an implementation flowchart of a write hole protection method for a RAID in the present invention.

Referring to FIG. 1, FIG. 1 is an implementation flowchart of a write hole protection method for a RAID in the present invention. The write hole protection method for a RAID may include the following steps.

In step S101, a log area is preset, and the log area is set to be in an enabled state after a RAID is degraded.

When setting a log area, the log area may be set based on member disks of a RAID, and other hard disks other than the member disks of the RAID may also be used as a log space.

For example, in a specific implementation, presetting a log area may specifically be: dividing a space of a preset size from each member disk of the RAID, and forming the set log area by the divided spaces.

In this implementation, a space is divided from each hard disk in the RAID, and these spaces may form the set log area. When the RAID is not degraded, the set log area is in a non-enabled state. Correspondingly, after the RAID is degraded, it is necessary to set the log area to be in an enabled state. It will be appreciated that after the RAID is degraded, an available log area is formed by the corresponding spaces of the healthy disks, so as to perform data backup in subsequent steps based on the log area.

In this implementation, the log area is set based on the member disks of the RAID, which is low-cost and facilitates solution implementation. However, in some implementations, the log area may also be set using solid state disks other than the member disks of the RAID, such as NVME solid state disks with higher performance, and 3D NAND solid state disks with higher performance and lifetime.

In step S102, when the log area is in the enabled state, before each stripe write operation, whether a data block of a failed member disk of the RAID in a stripe is a check data block is determined. If no, step S103 is performed.

For any stripe write operation, if the data block of the failed member disk of the RAID in a stripe is a check data block, it is indicated that the data block of the failed member disk in the stripe is not user data, no backup may be performed, and the conventional data blocks in the data blocks to be written may be written into the corresponding healthy member disks. That is, when it is determined that the data block of the failed member disk of the RAID in the stripe is the check data block, the stripe write operation may be directly started.

In step S103, if the data block is not the check data block, whether data blocks to be written of the stripe include a data block to be written into the failed member disk is determined. If yes, step S104 is performed, and if no, step S105 is performed.

The data block of the failed member disk of the RAID in the stripe is not the check data block, and it is indicated that the data block is a conventional data block. However, during each stripe write operation, the conventional data blocks involved in the stripe write operation may be different. For example, one stripe includes data blocks 1 to 5, the data blocks 1 to 4 are all conventional data blocks that are sequentially stored in member disks 1 to 4, and the data block 5 is a check data block that is stored in a member disk 5. For example, when a certain stripe write operation is performed, it is necessary to write data blocks 1, 2 and 3 into corresponding member disks in the stripe write operation, and assuming that the failed member disk is a member disk 1, it may be determined that the data blocks to be written include a data block to be written into the failed member disk at this moment.

For another example, when a certain stripe write operation is performed, it is necessary to write data blocks 2 and 4 into corresponding member disks in the stripe write operation, and assuming that the failed member disk is a member disk 1, it may be determined that the data blocks to be written do not include a data block to be written into the failed member disk at this moment.

In step S104, the data block to be written into the failed member disk is backed up in the log area.

For example, in the above example, it is necessary to write data blocks 1, 2 and 3 into corresponding member disks in the stripe write operation, i.e., the data blocks to be written are the data blocks 1, 2 and 3. The data block 1 is the data block to be written into the failed member disk, and the data block 1 is backed up in the log area.

In step S105, the data block of the failed member disk is calculated according to a RAID algorithm and the data block is backed up in the log area, or the data blocks to be written are backed up in the log area.

In step S105, two backup methods after triggering step S105 are disclosed, and the backup methods may be specifically selected in practical applications according to actual requirements, and may also be switched at any time. The data recovery may be achieved subsequently using either method.

It is still assumed that one stripe includes data blocks 1 to 5, the data blocks 1 to 4 are all conventional data blocks that are sequentially stored in member disks 1 to 4, and the data block 5 is a check data block that is stored in a member disk 5. For example, when a certain stripe write operation is performed, it is necessary to write data blocks 1, 2 and 5 into corresponding member disks in the stripe write operation, and assuming that the failed member disk is a member disk 4, it is indicated that the data blocks to be written do not include a data block to be written into the failed member disk.

At this moment, a backup mode is that a data block of the failed member disk is calculated based on a RAID algorithm, i.e. according to data blocks 1, 2 and 5 to be written in combination with a data block 3, i.e. a data block of a member disk 4 is calculated, and then the calculated data block of the member disk 4 is backed up in the log area.

Yet another backup mode is that the data blocks to be written are backed up directly in the log area. In this example, data blocks 1, 2 and 5 to be written are directly backed up in the log area.

It will be appreciated that the stripe write operation may be performed after step S104 or step S105 has been performed. That is, data blocks needing to be backed up for any stripe write operation are determined, and after backup is completed, the stripe write operation may be performed.

It should also be noted that during each backup operation of data blocks in the log area, the method may further include: saving association information of the backup operation to form a stripe log. Thus, when data recovery is subsequently performed, each valid stripe log may be determined through association information of the stripe logs in the log area, and data recovery may be performed based on the determined valid stripe logs.

The association information refers to relevant parameter data generated when backing up a data block, and the specifically included items may be set and adjusted as required. During any data block backup, data blocks in the backup and corresponding association information form a stripe log.

For example, in a specific implementation of the present invention, the saved association information includes at least: a stripe sequence number and a log number of the stripe log.

Then, the operation of determining each valid stripe log through association information of the stripe logs in the log area may specifically be:

traversing the association information of the stripe logs in the log area, and taking the stripe log having the largest log number among the stripe logs having the same stripe sequence number as the valid stripe log.

In this implementation, it is considered that one or more write operations may be performed for the same stripe, i.e. there may be cases where a plurality of stripe logs are for the same stripe, thus distinguishing by a log number and a stripe sequence number.

For any stripe log, a stripe sequence number refers to a sequence number of a stripe aimed by the stripe log in the RAID, i.e. a corresponding stripe and starting and ending sectors of a corresponding member disk may be found according to the stripe sequence number. In this implementation, the log number is an incremental number so as to identify the precedence of each stripe log for the same strip, i.e. when the stripe sequence numbers are the same, the stripe log having the largest log number is a valid log. In other implementations, other forms of log numbers that are not incremental may be used to distinguish the precedence of stripe logs for the same stripe without affecting the implementation of the present invention.

Further, in a specific implementation of the present invention, the saved association information includes at least: a stripe sequence number, a log number and a stripe log check value of the stripe log.

Correspondingly, determining each valid stripe log through association information of the stripe logs in the log area may specifically include the following two steps.

In the first step, the association information of the stripe logs in the log area is traversed, and the incomplete stripe logs are filtered according to the stripe log check values in the association information.

In the second step, the stripe log having the largest log number among the filtered stripe logs having the same stripe sequence number is taken as the valid stripe log.

In this implementation, a stripe log check value is further included in the association information, so that whether the data block in the stripe log is complete may be determined based on the stripe log check value, and a public check algorithm such as a CRC32 check algorithm may be used as the check algorithm. Since the stripe log check value is added to the association information in this implementation to filter the incomplete stripe logs, it is beneficial to find the situation of stripe log exception in time, and thus is beneficial to the accurate recovery of data.

In a specific implementation of the present invention, the saved association information module includes at least: a stripe sequence number, a log number, a stripe log check value and a log version number of the stripe log.

In this implementation, after step S106, the method needs to further include: updating a log area version number in general information recorded in the log area. That is, the log area version number needs to be updated after the recovery is completed.

Correspondingly, determining each valid stripe log through association information of the stripe logs in the log area in this implementation may specifically include the following three steps.

In the first step, the association information of the stripe logs in the log area is traversed, and the stripe logs of which the log version numbers do not match the current log area version number in the log area are filtered.

In the second step, the incomplete stripe logs are filtered according to the stripe log check values in the association information.

In the third step, the stripe log having the largest log number among the filtered stripe logs having the same stripe sequence number is taken as the valid stripe log.

In this implementation, it is considered that in some occasions, after performing data recovery using the log area, the RAID may still be in a degraded state, i.e. staff may not be able to recover a failed disk to a healthy disk in time, and therefore, the RAID needs to continue to perform write hole protection in the degraded state, i.e. the log area will then perform backup of data blocks to generate a corresponding stripe log. Therefore, in order to distinguish which stripe logs have been used before and which are unused, in this implementation, a log version number is included in the association information, and the log version number needs to be used in cooperation with the log area version number in the general information.

Specifically, in this implementation, the general information needs to be recorded in the log area, and relevant data in the general information is used to describe the attributes of the log area. The log area version number is used in cooperation with the log version number of each stripe log to determine which stripe logs are unused stripe logs. The stripe logs described herein are unused, i.e. no data recovery has been performed based on the stripe log.

For example, after a certain degradation of the RAID, the log area is enabled, and 16 stripe write operations are performed. Moreover, 16 stripe logs are backed up in the log area correspondingly, and the stripe logs have, for example, a log version number of 001 and a log area version number of 001. Then, if the RAID is failed, data recovery is performed based on these 16 stripe logs. After the completion of the recovery process, the log area version number is updated, for example, changed to 002. Then, for example, another 20 stripe write operations are performed. Moreover, 20 stripe logs are backed up in the log area correspondingly, and the stripe logs have a log version number of 002. Then, if the RAID is failed again, data recovery needs to be performed. At this moment, the log area has 16+20=36 stripe logs, and then data recovery is performed based on these 36 stripe logs. The specific process may be: firstly, the stripe logs of which the log version numbers do not match the current log area version number in the log area may be filtered, i.e. 16 stripe logs having a log version number of 001 are filtered, and then the incomplete stripe logs in the remaining 20 stripe logs are filtered according to the stripe log check values in the association information, three incomplete stripe logs are, for example, filtered, and 17 stripe logs remain. Finally, the stripe log having the largest log number among the stripe logs having the same stripe sequence number in the 17 stripe logs is taken as the valid stripe log. For example, three stripe logs in the 17 stripe logs have the same stripe sequence number, the remaining 14 stripe logs have different stripe sequence numbers, and then 15 valid stripe logs may be finally determined. After recovery with these 15 stripe logs, the log area version number may be adjusted to 003.

In this example, the log area version number is updated after each recovery so as to cooperate with the log version number to determine which stripe logs have been used. In other implementations, other specific implementations are possible without affecting the implementation of the present invention.

Moreover, in the foregoing embodiment, when the log area version number is updated, it is an incremental update, i.e. an increment of 1. However, in other implementations, other update modes may also be used as long as it is ensured that the log area version number is different from historical log area version numbers after being updated. For example, the value of the log area version number may be increased by 2 each time. For another example, a larger random number may be used for updating, etc.

In addition, it should be noted that in practical applications, other parameters may also be included in the association information. For example, a log size of a stripe log may also be included, and the log size indicates the size of a continuous occupied space of the stripe log. It should be noted that since the stripe log is composed of backed-up data blocks and corresponding association information, the log size contains the backed-up data blocks and the association information, i.e. the size of the entire stripe log. For another example, a member disk number, a data length, etc. may also be included in the association information.

Of course, in addition to the log area version number, the general information in the log area may also include other parameters. For example, the general information further includes: an enabled state of a log area, the size of a log space, a starting address of a stripe log, the size of a stripe log space, the number of stripe log alignment areas, a log area check value, etc., so that the staff may quickly and conveniently learn the state of the log area based on the general information.

The enabled state of the log area is used to indicate whether the log area is enabled, i.e. after the RAID is degraded, the log area is enabled, and if the RAID is not degraded, the log area is not enabled. Of course, when the RAID type is not RAID5 or RAID6, the log area is not enabled.

The size of the stripe log space is a fixed value, and the size of the stripe log space plus the occupied space of the general information is the size of the log space. The starting address of the stripe log refers to a starting address of the first stripe log.

The size of each log alignment area may be obtained by dividing the size of the stripe log space by the number of stripe log alignment areas. For example, the size of the stripe log space is 2G, and the number of preset stripe log alignment areas is, for example, 1024. Then the size of each log alignment area is 2M. The meaning of 2M refers to the case where one or more stripe logs are stored in the 2M space, but no stripe log crosses the 2M space, i.e. the head of each log alignment area is starting and ending positions of a certain stripe log. In this manner, by aligning the starting address of each log alignment area with the starting address of the corresponding stripe log, the stripe log may be more quickly positioned and found.

It should also be noted that the stripe logs may be sequentially written into each log alignment area, so as to better ensure the lifetime of a hard disk.

The log area check value may check the data integrity of the log area.

In step S106, when the degraded RAID is started after a failure, data recovery is performed using the log area.

Specifically, data recovery may be performed according to the stripe logs in the log area, and of course, when the contents of backed-up data blocks in the stripe logs are different, the data recovery means used may be different.

Before performing data recovery using the log area, whether the log area is valid may be determined. After it is determined that the log area is valid, when performing data recovery using the stripe logs, as described above, each valid stripe log may be usually determined through association information of the stripe logs in the log area, and data recovery may be performed based on the determined valid stripe logs. After the recovery is completed, the general information of the log area may be reinitialized, and specifically, the log area version number may be updated.

If a certain stripe log determined to be valid backs up data blocks to be written, i.e. backs up data blocks to be written to healthy member disks, it is indicated that the write operation corresponding to the stripe log does not involve a failed member disk, then the backed-up data blocks may be directly written into the corresponding healthy member disks, so that the data of each healthy member disk is correct data, and thus a data block of the failed member disk determined based on the correct healthy member disk is naturally correct, thereby avoiding the write hole problem. It should be noted, however, that when a data block to be written into a healthy member disk is backed up, the space for the log area is large.

However, if the data block of the failed member disk is backed up in the stripe log, since the backup is an overall backup, i.e. the data block of the failed member disk may be obtained directly through the stripe log, the write hole problem can also be avoided. Specifically, a correct check data block may be calculated based on the backed-up data block of the failed member disk and the conventional data blocks in the healthy member disks, and the check data block is written into a check disk, so that data in the check disk may be accurate data. Then, if the data block of the failed member disk is to be acquired, the data block may be accurately calculated by the healthy member disks.

Therefore, the present application is also able to obtain the correct data of the failed member disk, assuming that the write hole problem occurs, i.e. a case where the write progress of the healthy member disks is not synchronized.

In a specific implementation of the present invention, performing data recovery based on the determined valid stripe logs may specifically include the following steps.

In the first step, when any valid stripe log in the log area backs up a data block of a failed member disk, check block data is calculated based on backup data in the stripe log and read data of member disks, and data recovery of a check disk is performed using the calculated check block data.

In the second step, when any valid stripe log in the log area backs up data blocks to be written, the data blocks to be written are written into corresponding healthy member disks to complete data recovery.

Specifically, when any valid stripe log in the log area backs up a data block of a failed member disk, data verification and recovery of the check disk may be performed based on backup data in this implementation. That is, the data blocks of other healthy member disks are read, and in combination with the backed-up data block of the failed member disk in the stripe log, correct check data blocks may be calculated.

After the correct check data blocks are calculated, the calculated check block data may be directly written into the check disk, so that the data block of the failed member disk may be accurately determined by the data blocks of the healthy member disks, thereby achieving the write hole protection.

Further, before the calculated check block data is directly written into the check disk, the check data block may also be read from the check disk firstly. If the calculated check data block is inconsistent with the read check data block, it is indicated that the check data block on the check disk is incorrect, and event recording may be performed. After recording, the calculated check block data is written into the check disk.

When any stripe log in the log area backs up data blocks to be written, it is indicated that the data blocks of the healthy member disks are backed up by the stripe log. Then, a data block of a failed disk may be calculated according to the data blocks backed up in the stripe log and data blocks of other member disks, which is denoted as A. The data blocks of the stripe on all healthy member disks are read, and a data block of the failed disk is calculated, which is denoted as B. If A and B are different, it is indicated that the data blocks on the healthy member disks are incorrect, event recording may be performed, and the data blocks to be written are written into the corresponding healthy member disks to complete data recovery, i.e. the backed-up data blocks in the stripe log are written into the corresponding healthy member disks to complete data recovery. Usually, the error is caused by data errors of the check disk. Of course, instead of performing the comparison operation in this embodiment, the data blocks to be written are directly written into the corresponding healthy member disks to complete data recovery since the data blocks backed up are correct data blocks.

The technical solution provided by embodiments of the present invention does not involve multi-controller communication, i.e. the solution of the present application may be applied in single-controller occasions or multi-controller occasions. However, in the solution of the present application, a log area is preset, the log area is set to be in an enabled state after a RAID is degraded, and a corresponding backup operation is performed before each stripe write operation, thereby avoiding the write hole problem. Specifically, when a data block of a failed member disk is backed up, since the backup is an overall backup, the data block of the failed member disk may be obtained directly through the log area and is correct data. In addition, it is also possible to read data blocks of other healthy member disks, and calculate a correct check data block in combination with the backed-up data block of the failed member disk, so as to avoid the case where the check data block is erroneous. If data blocks to be written are backed up, i.e. the data block to be written into the healthy member disks are backed up, indicating that the write operation does not involve the failed member disk, the backed-up data blocks to be written may be directly written into the corresponding healthy member disks, so that the data of each healthy member disk is correct data.

Corresponding to the above method embodiment, an embodiment of the present invention also provides a write hole protection system for a RAID, which may be referred to the above correspondingly.

Figure 2:
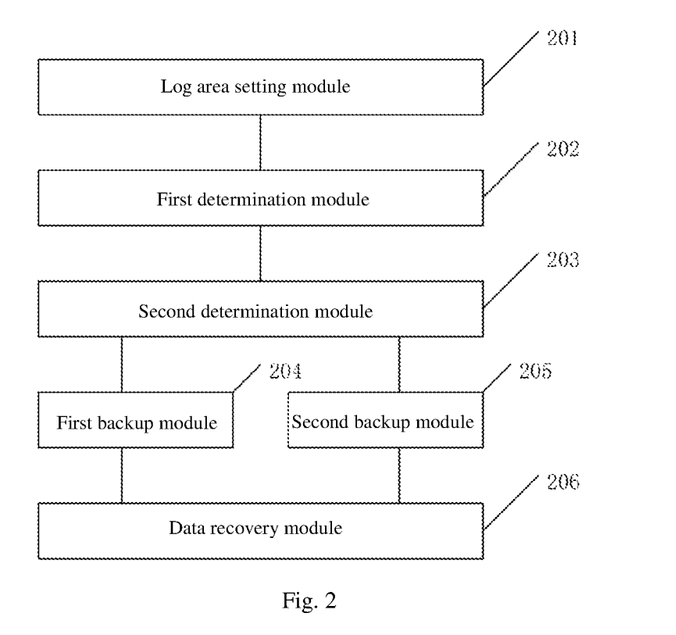
FIG. 2 is a schematic structure diagram of a write hole protection system for a RAID in the present invention.

FIG. 2 shows a schematic structure diagram of a write hole protection system for a RAID in the present invention. The system includes:

a log area setting module 201, configured to preset a log area, and set the log area to be in an enabled state after a RAID is degraded;

a first determination module 202, configured to determine, before each stripe write operation when the log area is in the enabled state, whether a data block of a failed member disk of the RAID in a stripe is a check data block;

if the data block is not the check data block, a second determination module 203 being triggered;

the second determination module 203, configured to determine whether data blocks to be written of the stripe include a data block to be written into the failed member disk;

if yes, a first backup module 204 being triggered, and if no, a second backup module 205 being triggered;

the first backup module 204, configured to back up the data block to be written into the failed member disk in the log area;

the second backup module 205, configured to calculate the data block of the failed member disk according to a RAID algorithm and back up the data block in the log area, or back up the data blocks to be written in the log area; and a data recovery module 206, configured to perform, when the degraded RAID is started after a failure, data recovery using the log area.

In a specific implementation of the present invention, the system further includes a stripe log generation module, configured to: save, during each backup operation of data blocks in the log area, association information of the backup operation to form a stripe log.

Correspondingly, the data recovery module 206 is specifically configured to: determine, when the degraded RAID is started after a failure, each valid stripe log through association information of the stripe logs in the log area, and perform data recovery based on the determined valid stripe logs.

In a specific implementation of the present invention, the association information saved by the log generation module includes at least: a stripe sequence number and a log number of the stripe log.

Correspondingly, the data recovery module 206 is specifically configured to:

traverse, when the degraded RAID is started after a failure, the association information of the stripe logs in the log area, and take the stripe log having the largest log number among the stripe logs having the same stripe sequence number as the valid stripe log.

In a specific implementation of the present invention, the association information saved by the log generation module includes at least: a stripe sequence number, a log number and a stripe log check value of the stripe log.

Correspondingly, the data recovery module 206 is specifically configured to:

traverse, when the degraded RAID is started after a failure, the association information of the stripe logs in the log area, and filter the incomplete stripe logs according to the stripe log check values in the association information; and take the stripe log having the largest log number among the filtered stripe logs having the same stripe sequence number as the valid stripe log.

In a specific implementation of the present invention, the association information saved by the log generation module includes at least: a stripe sequence number, a log number, a stripe log check value and a log version number of the stripe log.

After performing data recovery using the log area, the system further includes a log area version number update module, configured to update a log area version number in general information recorded in the log area after the data recovery module 206 performs data recovery using the log area.

Correspondingly, the data recovery module 206 is specifically configured to:

traverse, when the degraded RAID is started after a failure, the association information of the stripe logs in the log area, and filter the stripe logs of which the log version numbers do not match the current log area version number in the log area;

filter the incomplete stripe logs according to the stripe log check values in the association information; and take the stripe log having the largest log number among the filtered stripe logs having the same stripe sequence number as the valid stripe log.

In a specific implementation of the present invention, the data recovery module 206 is specifically configured to:

when the degraded RAID is started after a failure, if any valid stripe log in the log area backs up a data block of a failed member disk, calculate check block data based on backup data in the stripe log and read data of member disks, and perform data recovery of a check disk using the calculated check block data; and when the degraded RAID is started after a failure, if any valid stripe log in the log area backs up data blocks to be written, write the data blocks to be written into corresponding healthy member disks to complete data recovery.

In a specific implementation of the present invention, the log area setting module 201 is specifically configured to:

divide a space of a preset size from each member disk of the RAID, and form the set log area by the divided spaces.

In a specific implementation of the present invention, the log area setting module 201 is specifically configured to:

set the log area using solid state disks other than the member disks of the RAID.

Corresponding to the above method and system embodiments, an embodiment of the present invention also provides a computer-readable storage medium having stored thereon a computer program which, when executed by a processor, implements the steps of the write hole protection method for a RAID described in any of the above. The computer-readable storage medium described herein includes a random access memory (RAM), a memory, a read-only memory (ROM), an electrically programmable ROM, an electrically erasable programmable ROM, a register, a hard disk, a removable disk, a CD-ROM, or any other form of storage medium known in the art.

Professionals would further appreciate that the units and algorithm steps of the examples described in connection with the embodiments disclosed herein can be implemented as electronic hardware, computer software, or combinations of both, and that the components and steps of the examples have been described above generally in terms of their functionality for the sake of clarity and interchangeability of hardware and software. Whether such functionality is implemented as hardware or software depends upon the particular application and design constraint conditions of the technical solutions. Professionals may implement the described functionality in different ways for each particular application, but such implementation should not be interpreted as causing a departure from the scope of the present invention.

The principles and implementations of the present invention have been set forth herein using specific examples, which have been set forth only to aid in the understanding of the technical solutions and core ideas of the present invention. It should be noted that a person of ordinary skill in the art may make numerous improvements and modifications to the present invention without departing from the principles of the present invention. Such improvements and modifications are intended to be within the scope of the appended claims of the present invention.

What is claimed is:

1. A write hole protection method for a redundant array of independent disks (RAID), comprising:

presetting a log area, and setting the log area to be in an enabled state after a RAID is degraded;

when the log area is in the enabled state, determining, before each stripe write operation, whether a data block of a failed member disk of the RAID in a stripe is a check data block;

when the data block is not the check data block, determining whether data blocks to be written of the stripe comprise a data block to be written into the failed member disk;

when data blocks to be written of the stripe comprise the data block to be written into the failed member disk, backing up the data block to be written into the failed member disk in the log area;

when data blocks to be written of the stripe do not comprise the data block to be written into the failed member disk, calculating the data block of the failed member disk according to a RAID algorithm and backing up the data block in the log area, or backing up the data blocks to be written in the log area;

during each backup operation of data blocks in the log area, saving association information of the backup operation to form a stripe log; and when the degraded RAID is started after a failure, performing data recovery using the log area, wherein the performing data recovery using the log area comprises:

determining each valid stripe log through association information of the stripe logs in the log area, and performing data recovery based on the valid stripe logs, and wherein one of:

the association information comprises at least: a stripe sequence number and a log number of the stripe log, and the determining each valid stripe log through association information of the stripe logs in the log area comprises: traversing the association information of the stripe logs in the log area, and taking a stripe log having a largest log number among the stripe logs having a same stripe sequence number as the valid stripe log; or the association information comprises at least: a stripe sequence number, a log number and a stripe log check value of the stripe log, and the determining each valid stripe log through association information of the stripe logs in the log area comprises: traversing the association information of the stripe logs in the log area, and filtering incomplete stripe logs according to the stripe log check values in the association information to yield filtered stripe logs; and taking a stripe log having a largest log number among the filtered stripe logs having a same stripe sequence number as the valid stripe log, or the association information comprises at least: a stripe sequence number, a log number, a stripe log check value and a log version number of the stripe log; after performing data recovery using the log area, the method further comprises: updating a log area version number in general information recorded in the log area, and the determining each valid stripe log through association information of the stripe logs in the log area comprises: traversing the association information of the stripe logs in the log area, and filtering the stripe logs of which the log area version numbers do not match a current log area version number in the log area; filtering incomplete stripe logs according to the stripe log check values in the association information to yield filtered stripe logs; and taking a stripe log having a largest log number among the filtered stripe logs having a same stripe sequence number as the valid stripe log.

2. The write hole protection method for a RAID according to claim 1, wherein the performing data recovery based on the valid stripe logs comprises:

when any valid stripe log in the log area backs up a data block of the failed member disk, calculating check block data based on backup data in the stripe log and read data of member disks, and performing data recovery of a check disk using the check block data; and when any valid stripe log in the log area backs up data blocks to be written, writing the data blocks to be written into corresponding healthy member disks to complete data recovery.

3. The write hole protection method for a RAID according to claim 1, wherein the presetting a log area comprises:

dividing a space of a preset size from each member disk of the RAID, and forming the log area by the divided spaces.

4. The write hole protection method for a RAID according to claim 1, wherein the presetting a log area comprises:

setting the log area using solid state disks other than member disks of the RAID.

5. A non-transitory computer-readable storage medium, having stored thereon a computer program which, when executed by a processor, implements the steps of the write hole protection method for a RAID of claim 1.

6. A non-transitory computer-readable storage medium, having stored thereon a computer program which, when executed by a processor, implements the steps of the write hole protection method for a RAID of claim 2.

7. A non-transitory computer-readable storage medium, having stored thereon a computer program which, when executed by a processor, implements the steps of the write hole protection method for a RAID of claim 3.

8. A non-transitory computer-readable storage medium, having stored thereon a computer program which, when executed by a processor, implements the steps of the write hole protection method for a RAID of claim 4.

\* \* \* \* \*